No. 882,459. PATENTED MAR. 17, 1908.
W. H. FERRIS.
HARNESS FITTING.
APPLICATION FILED APR. 3, 1907.
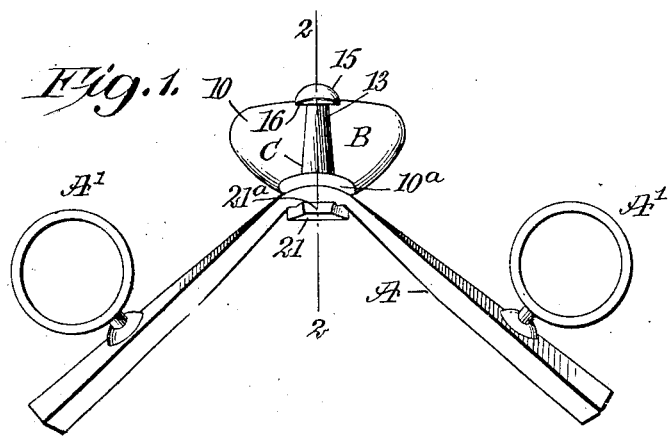
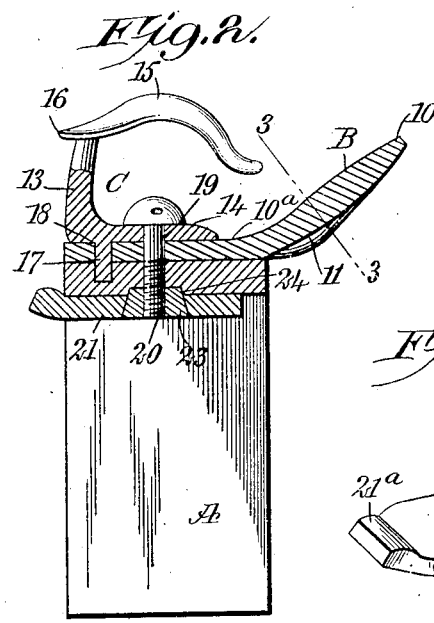
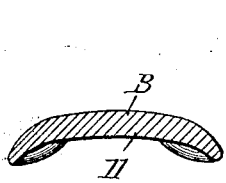
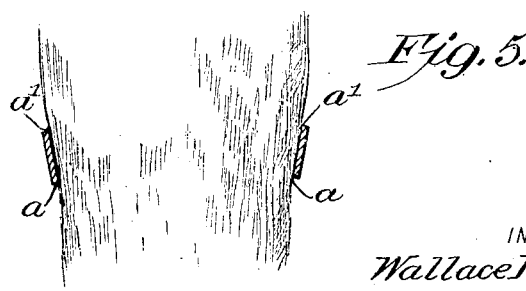
WITNESSES
INVENTOR
Wallace H. Ferris
BY
ATTORNEYS

UNITED STATES PATENT OFFICE.

WALLACE HINDMARSH FERRIS, OF SAULT STE. MARIE, MICHIGAN.

HARNESS-FITTING.

No. 882,459.

Specification of Letters Patent.   Patented March 17, 1908.

Application filed April 3, 1907.   Serial No. 366,146.

*To all whom it may concern:*

Be it known that I, WALLACE HINDMARSH FERRIS, a citizen of the United States, and a resident of Sault Ste. Marie, in the county of Chippewa and State of Michigan, have invented a new and useful Improvement in Harness-Fittings, of which the following is a full, clear, and exact description.

The purpose of the invention is to provide an improved form of harness tree and check hook, and a device for attaching the same to the harness tree in such manner that it leaves the inner surface perfectly smooth, and so that in the event of a broken hook it can be removed and replaced in a convenient and expeditious manner without damage to or the disturbance of the lining of the body.

Another purpose of the invention is to so form the tree that it will fit the back of a horse in such a perfect manner as not to chafe the same, as the face of the tree sets to the form of the horse and not on its edge as does the present tree and the hook is so constructed that the check rein under all conditions of use will not leave it until purposely removed.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a front elevation of the harness tree and a check hook applied thereto; Fig. 2 is a vertical section taken practically on the line 2—2 of Fig. 1; Fig. 3 is a transverse section through the skirt portion of the saddle, the section being taken practically on the line 3—3 of Fig. 2; Fig. 4 is a perspective detail view of the attaching plate of the attachment; and Fig. 5 is a plan view of a portion of the body of a horse, and a section through the harness tree, illustrating the manner in which it fits to the body.

A represents a harness tree and A' the ordinary rings employed as guides for the driving reins.

B represents the improved saddle; this saddle differs from others of its kind in that while its skirt section 10 is made flaring in the customary manner, the under surface 11 of the said skirt, where the skirt connects with the body section 10 of the saddle, is decidedly concave, as is best shown in Fig. 3, the concavity being pronounced. At the side round ribs are formed, as is shown in Fig. 3, but I do not confine myself to any particular formation of the skirt of the saddle. The body 10ª of the saddle B is contracted and straight, but its under surface is made to conform to the apex or arched portion of the harness-tree A, as is shown in Figs. 1 and 2. The check hook C that accompanies the saddle B consists of an upwardly and rearwardly curved shank 13 and a foot 14 that is fitted on the upper face of the body portion 10ª of the saddle B, and the head 15 of the hook is given the usual downward and rearward curvature, but where the head connects with the shank 13 a marginal flange 16 is formed, that extends beyond the front of the shank and beyond its sides, thus offering a barrier to the upward movement of the check rein that is in engagement with the shank of the hook. The foot 14 of the hook is provided with a lug 17 near its forward end extending from its bottom and this lug 17 is made to enter an aperture 18 in the body section 10ª of the saddle B, and likewise enters the tree A to a desired extent, as is shown in Fig. 2. An aperture 19 is produced in the body 14 of the hook C adjacent to the rear end of said body, and the threaded portion of a screw 20 is freely passed through this aperture, the screw being of sufficient length to extend through a corresponding aperture in the saddle in the same manner, and also loosely through the tree, as is shown in Fig. 1, and the head of said screw is by preference provided with a series of apertures whereby a spanner may be employed to turn the said screw.

The attaching plate 21 is located beneath the arched portion of the tree A of the harness, as is particularly shown in Fig. 2, and this attaching plate, as is shown in Fig. 4, is mainly flat, but is provided by preference at its forward end with a connected up-turned lip 21ª so as not to have uncomfortable bearing upon the animal's back, and it will be understood that the under face of this attaching plate is rendered as smooth as possible. The said plate is provided with an opening 22 therein, usually of rectangular formation, as is shown, and the walls of the said openings 22 are inclined from the bottom upward and inward and a nut 23 is fitted in this opening 22 in the attaching plate 21, which nut receives the lower end of the screw 20 and when the screw 20 is tightened up the bottom surface of the nut 23 will be flush with the bottom of the attaching plate 21 so providing for a perfectly smooth under surface for the said attaching plate.

The upper face of the nut 23 projects above the upper face of the plate and enters a concavity 24 in the tree, being held therein by the force of the bolt 20, so consequently the working and straining of the hook C is sustained by the tree and is not brought to bear directly on the nut, as is the case in the old construction, and therefore the nut cannot possibly become loose, insuring the hook C remaining in position, while the bolt remains intact.

The tree A may be made of any suitable material, stiff or flexible steel or other metal being preferably employed for the purpose. The ends of the tree are twisted as it were, or turned in such manner that the distance between the forward edge portions of the tree is less than the distance between the rear edge portions thereof, as is shown particularly at $a$ and $a'$ in Fig. 5, thus causing the tree to conform to that portion of the body designed to receive it, consequently preventing chafing, and by reason of the perfect fit better results are obtained than heretofore.

Having thus described my invention, I claim as new and desire to secure by Letters Patent,—

1. In a harness attachment, a tree, a saddle carried by the tree, a check hook located on the saddle, an attaching plate adapted to be located below the arch of the tree, which attaching plate is provided with an opening therein having tapering walls, a nut adapted to enter said opening in the attaching plate and to enter a corresponding recess in the tree, and a screw adapted to the nut, passed through the check hook and saddle, and a spur from the hook passed through the saddle and into the said tree.

2. In a harness fitting, a tree shaped to conform to the part of the horse to which it is applied, a saddle carried by the tree, a check hook having a foot portion located on the saddle and provided with a lug extending from its bottom near its forward end, the said lug extending through an aperture in the saddle and entering said tree, an attaching plate located below the arch of the tree, and means for clamping the saddle and the tree between the foot of the check hook and the attaching plate.

3. In a harness attachment, a tree, a saddle carried by the tree, a check hook located on the saddle, an attaching plate located at the arch of the tree and engaging the under face thereof, the said plate being provided with an opening, and having an upturned lip at its forward end, a nut adapted to fit in the opening in the attaching plate, and a screw passing through openings in the check hook, saddle and tree and engaging the said nut, the nut when the bolt is tightened being flush at its under face with the under face of the attaching plate.

4. In a harness attachment, a tree, a check hook saddle carried by the tree, a check hook having a foot portion located on the saddle, an attaching plate located below the arch of the tree and engaging the under face thereof, the said plate having an opening therein, a nut fitting in said opening, the upper end of the nut projecting above the upper face of the attaching plate and entering the said tree, and a screw passing through the foot of the check hook, saddle and tree and engaging said nut.

5. In a harness fitting, a tree shaped to conform to the part of the horse to which it is applied, a saddle carried by the tree, a check hook having a foot portion located on the saddle, an attaching plate engaging the under face of the arch of the tree, the said plate projecting at its forward end beyond the tree, and means for clamping the saddle and the tree between the foot of the check hook and the attaching plate.

6. In a harness attachment, a tree, a saddle carried by the tree, a check hook having a foot portion located on the saddle, an attaching plate engaging the under face of the arch of the tree, and having an opening therein provided with upwardly and inwardly inclined walls, a nut fitting in said opening, the upper end of the nut projecting above the upper face of the attaching plate and entering said tree, and a screw passing through the foot of the check hook, the saddle and the tree and engaging said nut, the under face of the attaching plate being smooth and the bottom surface of the nut when the parts are secured together being flush with said smooth under face of the attaching plate.

In testimony whereof I have signed my name to this specification in the presence of two subscribing witnesses.

WALLACE HINDMARSH FERRIS.

Witnesses:
 ETHEL H. THOMPSON,
 F. T. TREMPY.